Dec. 30, 1941.  E. W. McKAY ET AL  2,268,079
DISTRIBUTING MECHANISM
Filed Sept. 23, 1938  3 Sheets-Sheet 1

Inventors
Edward W. McKay
Wilfred A. Eaton
By
N. D. Parker Jr.  Attorney

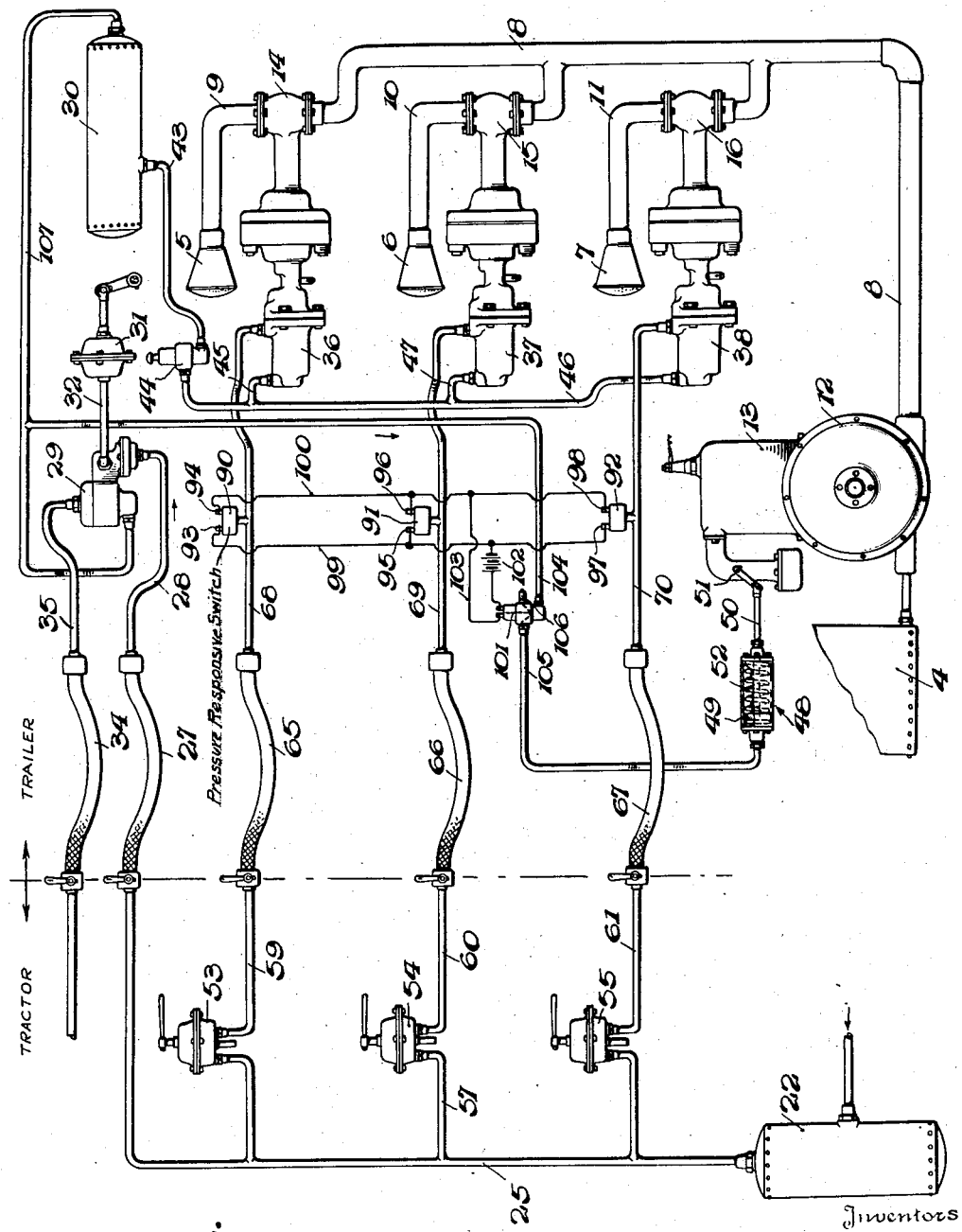

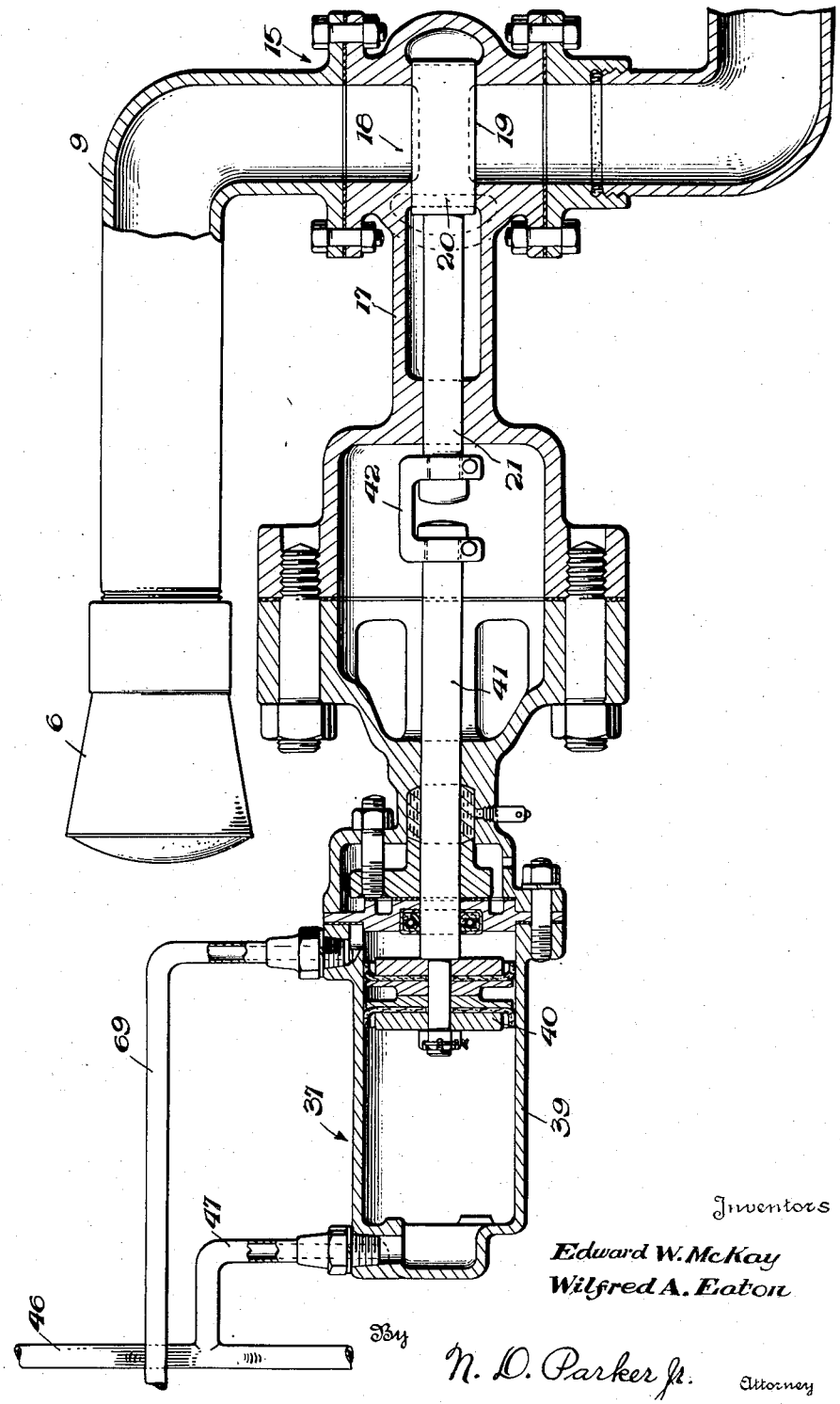

Patented Dec. 30, 1941

2,268,079

UNITED STATES PATENT OFFICE 2,268,079

DISTRIBUTING MECHANISM

Edward W. McKay and Wilfred A. Eaton, Pittsburgh, Pa., assignors to Bendix-Westinghouse Automotive Air Brake Company, Pittsburgh, Pa., a corporation of Delaware Application September 23, 1938, Serial No. 231,440

11 Claims. (Cl. 299—45)

This invention relates to a fluid distributing mechanism and more particularly to a system for controlling the distribution of liquid from a plurality of spray nozzles.

One of the objects of the present invention is to provide a simplified and efficiently operable system for controlling the distribution of fluid from a plurality of spray nozzles.

Another object is to provide a fluid distributing system for tractor-trailer vehicle trains, wherein the spray nozzles, located on the trailer, are controlled from the tractor by a novel arrangement of controls.

Still another object is to provide, in a system of the above character, a control mechanism on the tractor which will include a plurality of manually-operable valves which may be selectively operated to control respective spray nozzles on the trailer.

A further object is to provide, in a fluid distributing system embodying a plurality of spray nozzles and a variable speed pump for conducting liquid to the nozzles under pressure, a simplified arrangement simultaneously controlling the speed of the pump and the spray nozzles from a remote position on the tractor.

Other objects and novel features of the invention will appear more fully hereinafter from the following detailed description when taken in connection with the accompanying drawings wherein two embodiments of the invention are illustrated. It is to be expressly understood, however, that the drawings are utilized for purposes of illustration only and are not designed as a definition of the limits of the invention, reference being had for this latter purpose to the appended claims.

In the drawings, wherein similar reference characters refer to similar parts throughout the several views:

Fig. 2 is a diagrammatic view of a modified form of distributing mechanism, and

Fig. 3 is an axial sectional view of one of the valve mechanisms.

Figure 1:
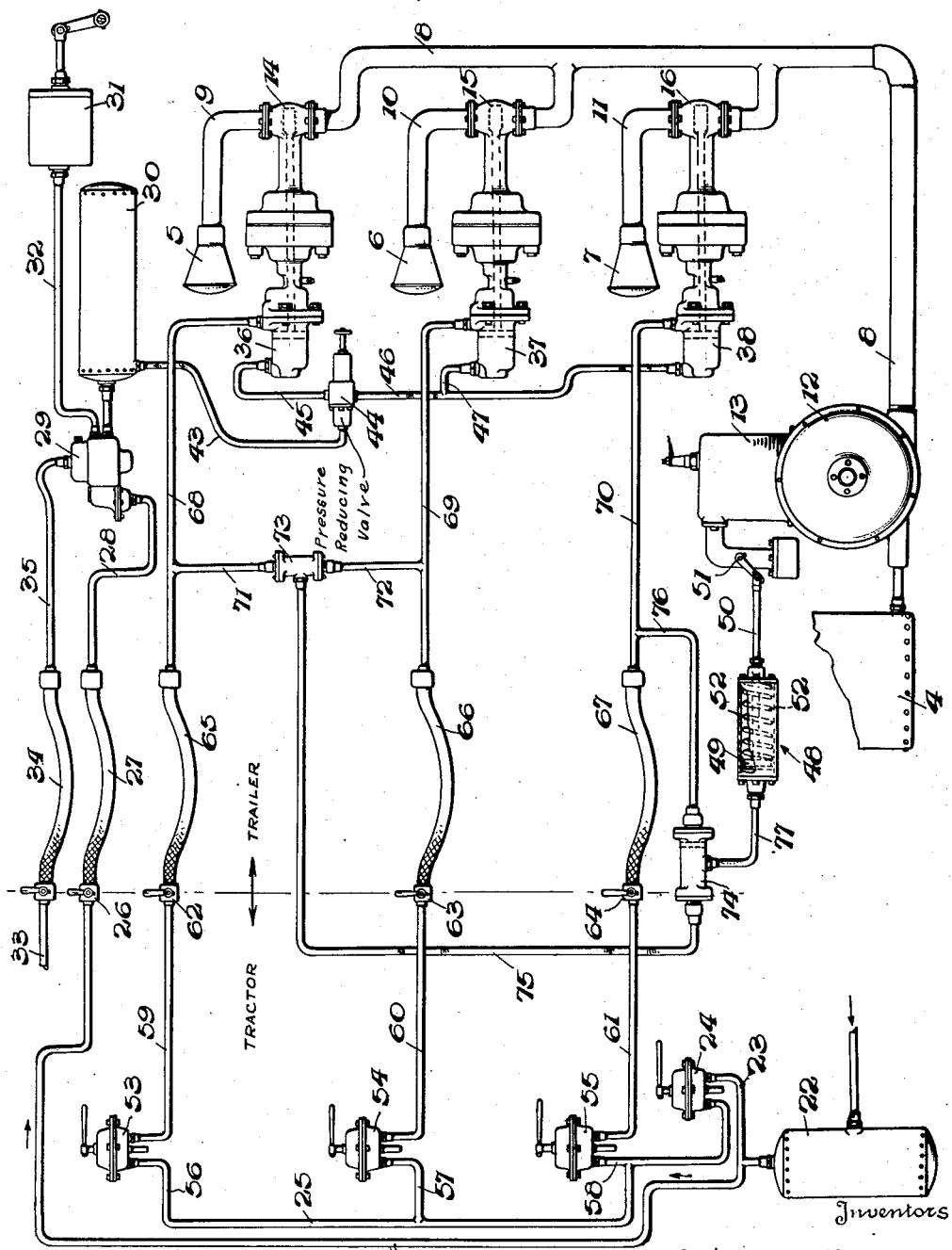
Fig. 1 is a diagrammatic view of a distributing mechanism constructed in accordance with the principles of the present invention.

Referring more particularly to Fig. 1, a distributing mechanism constructed in accordance with the present invention is illustrated therein in association with a tractor and trailer vehicle train. On the trailer, a tank 4 of liquid is connected to a plurality of spray nozzles 5, 6 and 7 which latter are suitably disposed at the rear of the trailer vehicle in such a manner as to distribute the liquid contained within tank 4 over the surface to be covered.

In order to connect the nozzles to the liquid tank, the latter is provided with a conduit 8 to which branch conduits 9, 10 and 11 are connected, each of the branch conduits being associated with the respective nozzles 5, 6 and 7. A variable speed pump 12 is inserted in conduit 8 and is provided for the purpose of delivering the liquid from tank 4 to the various spray nozzles under pressure in order to obtain an effective distribution of the liquid. As shown, the pump 12 is connected to a suitable driving means, such as engine 13, the construction being such that, when the speed of engine 13 is increased to a predetermined value, the pump 12 functions to deliver liquid to the spray nozzles at a relatively high pressure. When the engine 13 is idling, however, the pump 12 operates at such a relatively low speed that the pressure of the liquid is materially low.

Valve means 14, 15 and 16 are provided for respectively controlling the communication between branch conduits 9, 10 and 11 and the main conduit 8. As shown, see Fig. 3, such valve means include a housing 17 provided with aligned openings 18 and 19. Normally, flow of liquid past these openings is prevented by means of a gate valve 20 having an operating stem 21 connected therewith. As viewed in Fig. 3, communication between openings 18 and 19 may be effected when gate valve 20 is moved to the left.

Vehicle trains now in use for the most part are equipped with power braking systems and the present invention contemplates the utilization of fluid pressure from the braking system for controlling the operation of the valves heretofore described. Referring to Fig. 1, the braking system on the tractor vehicle includes a reservoir 22 of fluid under pressure, the said reservoir being connected by a conduit 23 to a main shut-off valve 24 and by a conduit 23a to a valve 26 at the rear of the truck to which a flexible conduit 27, associated with the trailer, is connected, the main shut-off valve 24 communicating with a conduit 25 for a purpose to be more fully described hereinafter. Conduit 27 is connected with conduit 28 and the latter communicates with a combined brake relay and emergency valve 29 which may be constructed as disclosed in the patent to Stephen Vorech et al. No. 2,049,984, dated August 4, 1936. The construction of the latter valve is such that, when the valve 26 is opened, fluid pressure from reservoir 22 may be conducted to trailer reservoir 30 and the latter may thus be kept charged for the purpose of applying the trailer brakes through operation of the relay portion of valve 29 which serves to connect reservoir 30 to a trailer brake chamber 31 through conduit 32. The control of the trailer brakes is effected through valvular mechanism, not shown, which supplies a conduit 33 with fluid under pressure, such fluid being conducted to the relay portion of valve 29 through flexible conduit 34 and conduit 35.

In order to utilize the fluid pressure in the trailer reservoir 30 for controlling the operation of valves 14, 15 and 16, fluid pressure actuators 36, 37 and 38 are associated with the respective valves. Referring more particularly to Fig. 3, the actuator 37 disclosed therein includes a cylinder 39 in which a double-acting piston 40 is suitably housed, the latter being provided with a piston rod 41 connected to valve stem 21 by a suitable coupling 42. From this construction, it will be observed that, when the piston 40 is moved to the right with respect to cylinder 39, as viewed in Fig. 3, the gate valve 20 will be closed and thus no liquid will issue from spray nozzle 6. However, as piston 40 moves to the left end of cylinder 39, gate valve 20 will be opened and liquid will be forced through the nozzle.

Referring to Fig. 1, reservoir 30 is provided with an outlet conduit 43 which conducts fluid pressure to a pressure-reducing valve 44 of any suitable construction. Valve 44 is so adjusted as to conduct fluid pressure to outlet conduits 45 and 46 in a substantially reduced amount, conduit 46 communicating directly with actuator 38 and with actuator 37 through a branch conduit 47. The pressure admitted and maintained by valve 44 is of such value that the pistons contained within actuators 36, 37 and 38 will be moved to the right in their respective cylinders and normally maintain the gate valves 14, 15 and 16 closed. Thus, with the parts in the normal position, no liquid will be transmitted to the spray nozzles.

It has heretofore been pointed out that the engine 13 controls the pressure of the liquid in conduit 8 through operation of the pump 12, and, in order to vary the speed of the engine, a fluid pressure-operated device 48 is associated with the throttle valve of the engine. Preferably, this association is constituted by a piston 49 having a piston rod 50 operatively connected with throttle valve 51, a spring 52 in the actuator normally serving to maintain the throttle in such position that the engine 13 runs at idling speed. Upon application of fluid pressure to actuator 48, however, piston 49 is moved to the right, as viewed in Fig. 1, to increase the throttle opening and cause the engine 13 to run at increased speed.

In order that the distribution of liquid may be easily and efficiently controlled by the operator of the tractor, a plurality of valves 53, 54 and 55 are provided on the tractor which are located in a position to be readily accessible. Each of these valves is similar in construction to the valve 24 and is of the well known three-way type which in one position serves to establish a flow of fluid through the valves, while in another position shuts off one conduit and connects the other to atmosphere. Each of valves 53, 54 and 55 is respectively connected with conduit 25 on the tractor through branch conduits 56, 57 and 58; valve 53, when operated to one position, serving to connect conduit 56 with a conduit 59; valve 54, when moved to open position, establishing communication between conduits 57 and 60, while valve 55 is effective to connect conduit 58 with conduit 61. Conduits 59, 60 and 61 terminate in shut-off valves 62, 63 and 64 positioned at the rear of the tractor and such latter valves are adapted to be connected with flexible conduits 65, 66 and 67 associated with the trailer.

With the main shut-off valve 24 in open position, upon operation of valve 53 to connect conduits 56 and 59, fluid under pressure is conducted from conduit 25 to actuator 36 on the trailer as by means of conduits 59, 65 and 68. In like manner, valve 54 may establish communication between conduit 25 on the tractor and actuator 37 on the trailer through conduits 57, 60, 66 and 69. Actuator 38 is provided with a conduit 70 which may be connected with conduit 25 when valve 55 is operated to connect conduits 58 and 61.

When any of the valves 53, 54 or 55 is operated as above described, fluid pressure is conducted to the right-hand portion of the respective actuators 36, 37 or 38, and, since the pressure so conducted is greater than that existing within the actuator on the opposite sides of the pistons 40, the latter are moved to the left, as viewed in Fig. 3, in order to open the gate valves controlled by the pistons. Thus, conduit 8 may be connected to one or a plurality of selected spray nozzles.

One of the novel features provided by the present invention resides in the control of the throttle-controlling actuator 48 concurrently with the operation of any selected gate valve. The construction is such that, when a selected gate valve is opened by means of the control valves on the tractor, the actuator 48 is simultaneously energized in order to open the throttle of the engine 13. Thus the speed of operation of pump 12 is increased to such an extent as to deliver fluid to any of the spray nozzles under a substantial pressure.

To the above end, conduits 68 and 69 communicate with branch conduits 71 and 72 respectively, said branch conduits communicating with a double-check valve 73 which may be constructed as disclosed in the patent to Wilfred A. Eaton No. 2,112,484, dated March 29, 1938. The outlet of the double-check valve communicates with a second double-check valve 74 as by means of a conduit 75, a branch conduit 76, communicating with conduit 70, being also connected with valve 74. The outlet of the latter valve is connected with the actuator 48 through conduit 77. Thus it will be apparent that, if conduit 68 is charged with fluid pressure, such fluid pressure will be conducted to the throttle actuator 48 through conduit 71, double-check valve 73, conduit 75, double-check valve 74 and conduit 77. In like manner, fluid pressure from conduit 69 may flow to actuator 48 through conduit 72, double-check valve 73, conduit 75, double-check valve 74 and conduit 77. When conduit 70 is charged with fluid pressure for the purpose of operating valve 16, the throttle valve actuator 48 may be energized through conduit 76, double-check valve 74 and conduit 77.

In operation, and assuming the spray nozzle 5 is desired to be rendered effective, it is only necessary for the operator to open the master valve 24 in order to establish communication between the reservoir 22 and conduit 25 and to also open valve 26 to establish communication between reservoir 22 and trailer reservoir 30. Trailer reservoir 30 is thus charged with fluid pressure and each of the valve actuators 36, 37 and 38 is operated through the reduced pressure controlled by valve 44 so that valves 14, 15 and 16 are in closed position. Thereafter, the operator opens valve 53 to establish communication between conduits 56 and 59. Fluid pressure conducted through conduit 68 to actuator 36 will promptly effect an opening of valve 14 and will also energize actuator 48 through the connections heretofore described. Hence, with the opening of valve 14, the throttle 51 of engine 13 will be opened and the speed of pump 12 will be increased to such an extent as to deliver liquid from tank 4 to the spray nozzle under substantial pressure.

If it is subsequently desired to distribute liquid through spray nozzles 6 or 7 or both, it is only necessary for the operator to open valves 54 or 55, or both of them. Under these conditions, valves 15 and/or 16 will be opened and the throttle valve actuator 48 will remain in its energized position.

It is to be noted that, as the valves 53, 54 and 55 are moved to closed position in order to exhaust lines 59, 60 and 61, the throttle valve actuator 48 will remain energized until the last of said conduits is exhausted. In other words, as long as fluid pressure remains in any of the conduits 68, 69 or 70, actuator 48 will be moved to throttle-opening position. In the event that two or three of the valves 53, 54 and 55 are in open position and it is desired to close the corresponding spray valves and the engine throttle simultaneously, it is only necessary for the operator to close the main valve 24, thus exhausting fluid pressure therethrough from the right ends of actuators 36, 37 and 38 as well as throttle actuator 48.

In Fig. 2, a slightly modified form of the invention is disclosed wherein the double-check valves disclosed in Fig. 1 for conducting fluid pressure to the actuator 48 are eliminated and an electrical control system is utilized in lieu thereof.

As shown in this figure, each of the conduits 68, 69 and 70 is associated with pressure-operated switch devices 90, 91 and 92. Such switch devices may be constructed as shown in the patent to Stephen Johnson et al. No. 1,925,762, dated September 5, 1933, and are so constituted as to close a pair of contacts when the pressure in the respective conduits reaches a certain predetermined value. For example, when switch 90 closes, a circuit is established between terminals 93 and 94. When switch 91 operates, terminals 95 and 96 are connected. Terminals 97 and 98 associated with switch device 92 are connected when such device operates in accordance with the supplying of fluid pressure to conduit 70.

Operation of any of the aforementioned switch devices and the connection of the terminals associated therewith completes an electrical circuit through wires 99 and 100 to an electromagnetically-operated valve 101, the latter being connected to a battery 102 having a connection with wire 99 and being also connected to wire 100 as by means of lead 103. The valve 101 may be constructed in accordance with the disclosure in the patent to Wilfred A. Eaton No. 2,035,305, dated March 24, 1936, and is arranged in such a manner as to connect conduits 104 and 105 when energized. When deenergized, conduit 104 is cut off while conduit 105 is connected to an exhaust conduit 106.

Conduit 104 communicates with the trailer reservoir 30 through conduit 107, it being readily understood from this construction that, when the electromagnetically-operated valve 101 is energized through operation of any of the switch devices 90, 91 or 92, fluid pressure from the trailer reservoir 30 will be led to the actuator 48 through conduits 107 and 104, valve 101 and conduit 105. Thus, when any of the conduits 68, 69 or 70 is energized to open valves 14, 15 or 16, the throttle actuator 48 will be concurrently operated to increase the speed of the engine 13 and thus cause the delivery to the selected spray nozzel of liquid under pressure from tank 4.

There has thus been provided by the present invention a relatively simple arrangement for distributing liquid from a trailer under the direct supervision of the operator of the tractor. The arrangement is such that the fluid pressure from the usual braking system is utilized for selectively controlling the operation of the spray nozzles and the piping arrangement on the trailer is so arranged as to secure an automatic increase in the pressure of the liquid conducted to the selected spray nozzle upon the operation of a single valve on the tractor. Thus, multiple control elements are eliminated and the system is greatly simplified.

While two embodiments have been disclosed herein and have been described with considerable particularity, it is to be understood that the invention is not limited to those forms illustrated but is capable of a variety of expressions, as well understood by those skilled in the art. Reference will, therefore, be had to the appended claims for a definition of the limits of the invention.

What is claimed is:

1. A distributing mechanism comprising a source of liquid, an outlet, valve means controlling said outlet, a conduit connecting the valve means and source, a pump in said conduit, a variable speed engine drivably connected with said pump, fluid pressure-operated means for increasing the speed of the engine, fluid pressure means for opening the valve means, and means including a manually-operable valve for supplying fluid pressure concurrently to both said fluid pressure means to simultaneously increase the speed of the engine and open the valve means.

2. Apparatus of the class described comprising a tractor, a trailer, a plurality of spray nozzles on the trailer, a source of liquid, means for connecting said source with each nozzle, valve means common to each nozzle, a pump on the trailer for increasing the pressure of the liquid, single means for varying the speed of the pump, means associated with each valve for controlling the operation thereof, means on the tractor for selectively and individually controlling said last named means, and means responsive to the operation of any of the tractor carried means to control said speed-varying means.

3. In combination with a trailer vehicle having a reservoir of fluid pressure thereon, a spray nozzle, a source of liquid, a conduit connecting said source and nozzle, a valve in said conduit, a pump in said conduit between the valve and source, a variable speed motor drivably connected with said pump, means including a fluid-operated actuator for varying the speed of the motor, a fluid-operated device having an element movable to operate said valve, means including a pressure-reducing valve connecting said device and reservoir for applying a reduced pressure to one part of said device for normally maintaining said element in valve closing position, a conduit connecting another part of said device and actuator, a tractor vehicle, and means including a valve on the tractor for conducting fluid to said last named conduit, the pressure of the last named fluid being greater than the pressure of the fluid admitted to said device by the pressure-reducing valve, whereby the element is moved to valve opening position and the actuator is operated to increase the speed of the motor.

4. In combination with a trailer vehicle having a reservoir of fluid pressure thereon, a spray nozzle, a source of liquid, a conduit connecting said source and nozzle, a valve in said conduit, a pump in said conduit between the valve and source, a variable speed motor drivably connected with said pump, means including a fluid-operated actuator for varying the speed of the motor, a fluid-operated device for operating said valve, means including a pressure-reducing valve connecting said device and reservoir for applying a reduced pressure to said device for normally maintaining said valve closed, a tractor vehicle, and means for simultaneously applying an increased pressure to said device for opposing said reduced pressure to open the valve, and to said actuator to increase the speed of said motor, said last named means including a single manually-operable valve on the tractor.

5. In combination with a tractor and a trailer, a reservoir of fluid pressure on the tractor, a reservoir of fluid pressure on the trailer, a spray nozzle on the trailer, a tank of liquid, a connection between the tank and nozzle including a variable speed pump and a valve, fluid pressure operated means arranged to be supplied with reduced trailer reservoir pressure to normally close the valve and arranged to be supplied with tractor reservoir pressure to open the valve, and means including a valve on the tractor for applying tractor reservoir pressure to said fluid pressure operated means to simultaneously open the valve and increase the speed of the pump.

6. In combination with a trailer vehicle having a tank provided with a plurality of outlets connected thereto, a valve associated with each outlet, a pump for increasing the pressure of the fluid conducted from the tank to each outlet, a fluid pressure device for each valve, means associated with each device for normally maintaining said valves closed, an engine for driving said pump, means for varying the speed of said engine, a fluid pressure actuator for operating said speed-varying means, a tractor vehicle, means including a plurality of valves on the tractor for selectively energizing said fluid pressure devices to open said valves, and means connecting said devices and actuator to energize the latter simultaneously with energization of any selected device.

7. In a fluid distributing system, a fluid conduit, a valve therein, a pump in said conduit, a throttle-controlled engine for driving said pump, fluid pressure-operated means for increasing the opening of the throttle, fluid pressure-operated means for opening said valve, and means including a single, remotely-positioned valve for simultaneously supplying fluid pressure to both said fluid pressure operated means.

8. In combination with a tractor and trailer, a source of fluid pressure on the tractor, a reservoir of fluid pressure on the trailer, a conduit between said source and reservoir for supplying fluid pressure to the latter, a tank on the trailer having a plurality of outlets connected thereto, a valve associated with each outlet, a pump for increasing the pressure of fluid conducted from the tank to said outlets, a double acting fluid pressure motor for operating each valve, means for continuously supplying fluid pressure from said trailer reservoir to said motors at a pressure less than that at the source and in the trailer reservoir for normally maintaining said valves in closed position, means for varying the speed of the pump, a fluid pressure-actuator for operating said speed varying means, control valves on the tractor for selectively supplying fluid from the tractor carried source to each of said motors for overcoming the action of said lower pressure and opening said valves, and means rendered effective on operation of any one of said control valves to energize the corresponding motor, for concurrently energizing said actuator to increase the speed of the pump and rendered effective to deenergize said actuator only on operation of said control valves to deenergize all of said motors.

9. A fluid distributing system comprising a tank, a conduit connected thereto, a pair of outlets in said conduit, a valve associated with each outlet, a pump for increasing the pressure of the fluid conducted from the tank to each outlet, a prime mover for driving the pump, fluid pressure-operated means for increasing and decreasing the speed of the prime mover, fluid pressure-operated means for opening each of said valves, fluid pressure-operated means for closing each of said valves, a source of fluid pressure, means for continuously supplying fluid at reduced pressure from the source to the third named means for closing the valves, a pair of control valves for selectively connecting the source with either of the second named means for opening the corresponding valves, and means for energizing the speed increasing portion of said first named means upon the opening of either of said control valves and maintaining said portion energized until both of said control valves are closed.

10. In combination with a tank having a plurality of outlets connected thereto, a normally closed valve associated with each outlet, a pump for increasing the pressure of the fluid conducted from the tank to each outlet, a fluid pressure responsive device so connected to each valve as to open the same upon the application of fluid pressure thereto, means including a fluid pressure responsive actuator for increasing the speed of operation of the pump upon the application of fluid pressure thereto, means for selectively applying fluid pressure to said fluid pressure responsive devices, and means so connecting all of said devices with said actuator that when the valve opening movement of any selected device occurs, the actuator is concurrently operated to increase the speed of operation of the pump.

11. In combination with a tank having a plurality of outlets connected thereto, a normally closed valve associated with each outlet, a pump for increasing the pressure of the fluid conducted from the tank to each outlet, a fluid pressure responsive device so connected to each valve as to open the same upon the application of fluid pressure thereto, means including a fluid pressure responsive actuator for increasing the speed of operation of the pump upon the application of fluid pressure thereto, means including control valves for selectively applying fluid pressure to said fluid pressure responsive devices, means including a conduit for selectively connecting said actuator with any one of said devices, and a single conduit for individually connecting each of said control valves with said last named means for effecting concurrent application of fluid pressure to a corresponding device and said actuator.

EDWARD W. McKAY.
WILFRED A. EATON.